United States Patent
Park et al.

(10) Patent No.: US 9,766,506 B2
(45) Date of Patent: Sep. 19, 2017

(54) ARRAY SUBSTRATE AND LIQUID CRYSTAL DISPLAY DEVICE INCLUDING THE SAME

(71) Applicant: LG DISPLAY CO., LTD., Seoul (KR)

(72) Inventors: Heonkwang Park, Anyang-si (KR); SangHee Yu, Paju-si (KR); SungHyun Cho, Seoul (KR); SangWoon Kim, Goyang-si (KR); TaeSang Kim, Cheonan-si (KR)

(73) Assignee: LG DISPLAY CO., LTD., Seoul (KR)

( * ) Notice: Subject to any disclaimer, the term of this patent is extended or adjusted under 35 U.S.C. 154(b) by 45 days.

(21) Appl. No.: 14/714,799

(22) Filed: May 18, 2015

(65) Prior Publication Data

US 2015/0346533 A1    Dec. 3, 2015

(30) Foreign Application Priority Data

May 27, 2014  (KR) .................. 10-2014-0063698
May 29, 2014  (KR) .................. 10-2014-0064866

(51) Int. Cl.
  *G02F 1/1339*   (2006.01)
  *G02F 1/1335*   (2006.01)
  *G02F 1/1333*   (2006.01)

(52) U.S. Cl.
  CPC .... *G02F 1/13394* (2013.01); *G02F 1/133512* (2013.01); *G02F 2001/133357* (2013.01)

(58) Field of Classification Search
  CPC ............ G02F 1/1339; G02F 1/133377; G02F 1/133514; G02F 2001/133357
  See application file for complete search history.

(56) References Cited

U.S. PATENT DOCUMENTS

| | | | |
|---|---|---|---|
| 9,075,269 B2* | 7/2015 | Son | ............ G02F 1/134336 |
| 9,304,360 B2* | 4/2016 | Hui | ............ G02F 1/1339 |
| 2014/0085558 A1* | 3/2014 | Lee | ............ G02B 5/201 |
| | | | 349/43 |
| 2015/0098041 A1* | 4/2015 | Jung | ............ G02F 1/13394 |
| | | | 349/46 |

* cited by examiner

Primary Examiner — Timothy L Rude
(74) Attorney, Agent, or Firm — Dentons US LLP

(57) ABSTRACT

A liquid crystal display panel includes features to prevent damage to the liquid crystal alignment layer when a color filter substrate and a thin-film transistor array substrate are moved relative to each other. The liquid crystal display panel may include a column spacer on the color filter substrate under the black matrix and a bump pattern on the array substrate where the column spacer and the bump pattern are in contact with each other. The array substrate may otherwise include a planarization layer with a step portion and a protective layer on the planarization layer where the protective layer is in contact with the column spacer.

13 Claims, 14 Drawing Sheets

ARRAY SUBSTRATE AND LIQUID CRYSTAL DISPLAY DEVICE INCLUDING THE SAME

CROSS-REFERENCE TO RELATED APPLICATIONS

This application claims the priority of Korean Patent Application No. 10-2014-0063698 filed on May 27, 2014 and Korean Patent Application No. 10-2014-0064866 filed on May 29, 2014, in the Korean Intellectual Property Office, the disclosures of which are incorporated by reference in their entirety for all purposes as if fully set forth herein.

BACKGROUND

Field of the Disclosure

The present invention relates to a liquid crystal display device, and more particularly, to an array substrate capable of preventing a defect caused by a movement of a column spacer due to an external environment and a liquid crystal display device including the same.

Description of the Related Art

A liquid crystal display device has a high contrast ratio and is suitable for displaying a dynamic image with low power consumption, and, thus, it has been applied to various devices such as notebook computers, monitors, and TVs. Liquid crystal molecules, with a thin and long structure, have optical anisotropy by which there is directionality in their alignment. There is a polarization effect when an electric field is applied to the liquid crystal molecules and the molecules change in alignment direction. The liquid crystal display device displays an image using optical anisotropy and polarization of the liquid crystal molecules.

Generally, a liquid crystal display device includes a liquid crystal panel formed by interposing and bonding a liquid crystal layer between a first substrates and a second substrate, and electrodes are respectively formed inside each of the first substrate and the second substrate. An alignment direction of liquid crystal molecules is changed by an electric field applied to the electrodes, resulting in a change in light transmittance.

Such a change in light transmittance of the liquid crystal panel allows a light supplied from a backlight provided at the rear of the liquid crystal panel to be modulated. Color can be presented when the light supplied from the backlight passes through a color filter formed on one of the first or second substrates and is displayed in the form of an image.

Typically, a liquid crystal display device manufacturing process is divided into a substrate manufacturing process for forming each of an array substrate and a color filter substrate, a cell process for completing a liquid crystal panel, and a module process for integrating the liquid crystal panel and a backlight.

Particularly, in the substrate manufacturing process, a thin film deposition process, a photo-lithography process, and an etching process are repeated many times to form an array layer and a color filter layer on each substrate. An alignment film is formed on at least one of the substrates to orient the liquid crystal molecules. In the cell process, a seal pattern for bonding is formed on any one of an array substrate and a color filter substrate and the two substrates are bonded to each other with a liquid crystal layer interposed in between so as to complete a liquid crystal panel. In the module process, the completed liquid crystal panel is provided with a polarization plate and a driving circuit and is integrated with a backlight, to complete a liquid crystal display device.

Between the array substrate and the color filter substrate, a spacer is configured to maintain a uniform distance between the two substrates. The spacer is classified into a ball spacer or a column spacer depending on a shape and an arrangement method. The ball spacer is formed to be scattered on the array substrate or the color filter substrate, and the column spacer is formed by patterning on the array substrate or the color filter substrate.

In recent years, the column spacer which can be formed into a desired shape at a specific position has been widely used. The column spacer is typically formed on the color filter substrate to which relatively fewer processes are performed. However, when an external force is applied, the column spacer is moved and an alignment film is damaged, thereby causing a defect to the liquid crystal panel.

SUMMARY

As described above, in a liquid crystal display device according to an exemplary embodiment of the present invention, a bar-shaped bump pattern, which corresponds to a spacer, is formed on a surface of an array substrate. Thus, when the spacer is pushed up and down and/or side to side by an external force, contact between the spacer and an alignment film is minimized.

Further, in a liquid crystal display device according to an exemplary embodiment of the present invention, a planarization layer of an array substrate which corresponds to a spacer is formed to have a step height. Thus, when the spacer is pushed up and down and/or side to side by an external force, a contact between the spacer and an alignment film is minimized.

Therefore, a red eye defect (damage to an alignment film causing light leakage) can be prevented and aperture ratio can be increased, and, thus, a display quality can be improved, as described in detail below.

Details of other exemplary embodiments will be included in the detailed description of the invention and the accompanying drawings.

In the array substrate and the liquid crystal display device according to the present invention, the bar-shaped spacer configured to maintain a cell gap and the bar-shaped bump pattern formed in two rows are used. Thus, even if a substrate is moved by an external force, a contact between the bar-shaped spacer and an alignment film can be minimized due to a step height that is equal to a height of the bar-shaped bump pattern. Therefore, it is possible to prevent damage to the alignment film in a pixel area and thus possible to prevent a light leakage which may occur when a black image is displayed.

Further, in the array substrate and the liquid crystal display device according to the present invention, the planarization layer formed on a first substrate has a step height. Thus, even if a substrate is moved by an external force, the bar-shaped spacer is not brought into contact with the alignment film. Therefore, it is possible to prevent damage to the alignment film in a pixel area, and thus, it is possible to prevent a light leakage which may occur when a black image is displayed.

Herein, it is possible to prevent an increase in width of the black matrix by reducing an disposition density of the bar-shaped spacers. Thus, it is possible to improve an aperture ratio and increase luminance.

The effects of the present invention are not limited to the aforementioned effects, and other effects, which are not mentioned above, will be apparent to a person having ordinary skill in the art from the following description.

The objectives to be achieved by the invention, the means for achieving the objectives, and effects of the invention described above do not specify essential features of the claims, and, thus, the scope of the claims is not limited to the disclosure of the invention.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
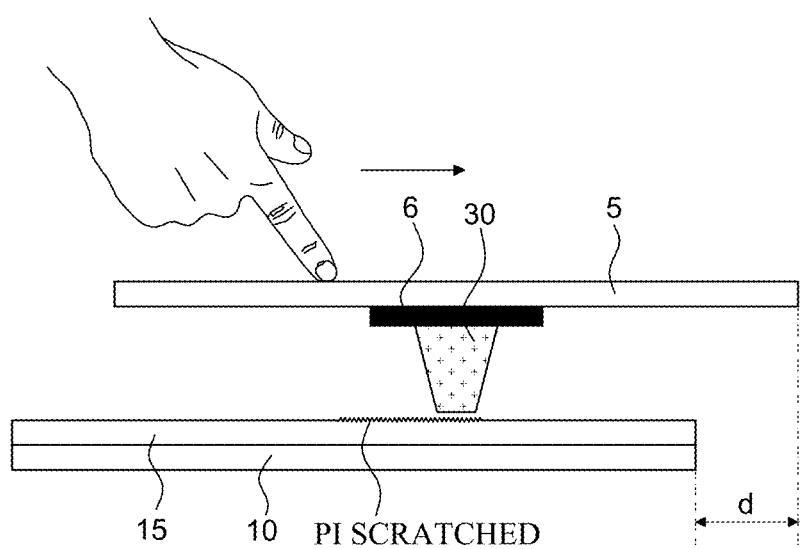
FIG. 1 is a cross-sectional view provided to explain a reason why a light leakage is caused by application of an external force.

Advantages and features of the present invention, and methods for accomplishing the same will be more clearly understood from exemplary embodiments described below with reference to the accompanying drawings. However, the present invention is not limited to the following exemplary embodiments but may be implemented in various different forms. The exemplary embodiments are provided only to complete disclosure of the present invention and to fully provide a person having ordinary skill in the art to which the present invention pertains with the category of the invention, and the present invention will be defined by the appended claims.

The shapes, sizes, ratios, angles, numbers, and the like shown in the accompanying drawings for describing the exemplary embodiments of the present invention are merely examples, and the present invention is not limited thereto.

Like reference numerals generally denote like elements throughout the present specification. Further, in the following description, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", "next" and the like, one or more parts may be positioned between the two parts unless the terms are used with the term "immediately" or "directly" is not used.

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be a second component in a technical concept of the present invention.

Throughout the whole specification, the same reference numerals denote the same elements.

Since size and thickness of each component illustrated in the drawings are represented for convenience in explanation, the present invention is not necessarily limited to the illustrated size and thickness of each component.

The features of various embodiments of the present invention can be partially or entirely bonded to or combined with each other and can be interlocked and operated in technically various ways as can be fully understood by a person having ordinary skill in the art, and the embodiments can be carried out independently of or in association with each other.

Various exemplary embodiments of the present invention will be described in detail with reference to the accompanying drawings.

Figure 2:
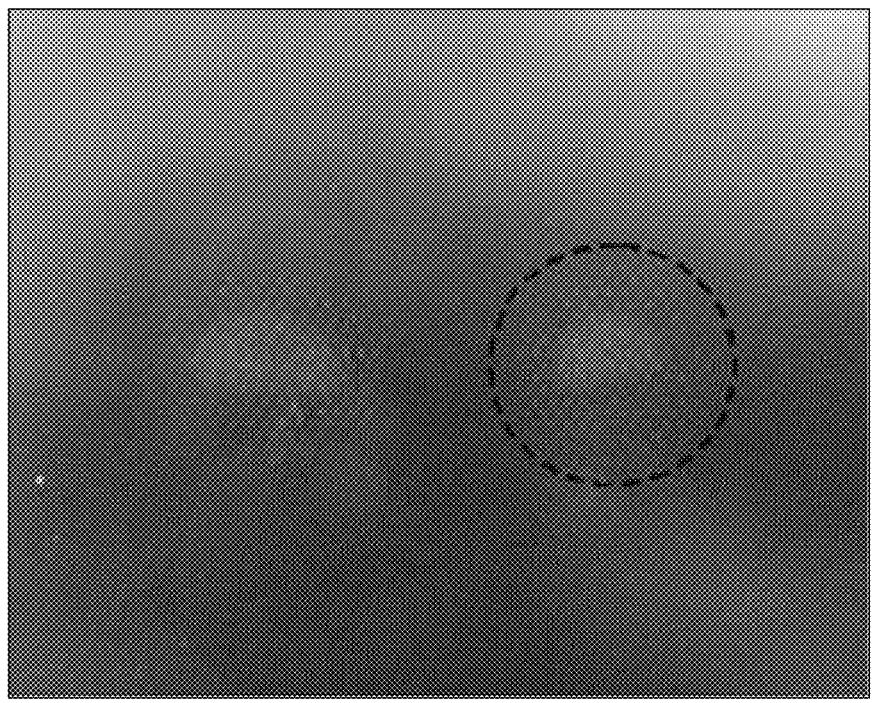
FIG. 2 is an image showing a part of a liquid crystal panel in which red eye defects occur.

FIG. 1 is a cross-sectional view provided to explain a reason why a light leakage is caused by an external force, and FIG. 2 is a photo image showing a part of a liquid crystal panel in which red eye defects occur.

Referring to FIG. 1 to FIG. 2, a spacer 30 is generally configured to uniformly maintain a cell gap of a liquid crystal panel and formed into a circular shape or the like on a black matrix 6 in a gate line area. In the following, the spacer 30 will be described as a column spacer.

The spacer 30 is formed to have a minimum size, to maintain the cell gap of the liquid crystal panel before a visual optical defect occurs. The black matrix 6 is formed to have a size suitable for preventing light leakage caused by disclination occurring when a liquid crystal is electrically driven or if disclination of the spacer 30 occurs during a rubbing process performed while forming an alignment film. Disclination being a defect in rotational symmetry in the orientation of the liquid crystal molecules.

Generally, the spacer 30 formed on a color filter substrate 5 is in contact with an array substrate 10. The spacer 30 may be moved in various directions with respect to the array substrate 10 when an external force is applied, and may return to its original position.

If this happens, the moving spacer 30 may cause damage to an alignment film 15 formed of polyimide (PI) on the array substrate 10. Due to the damage to the alignment film 15, a liquid crystal (not illustrated) of a liquid crystal layer (not illustrated) between the array substrate 10 and the color filter substrate 5 is misaligned and, thus, light leakage occurs. That is, when an external force is applied, there is a positional deviation by distance 'd', between the color filter substrate 5 and the array substrate 5. Due to such deformation of the liquid crystal panel caused by the external force, the spacer 30 formed on the color filter substrate 5 causes damage, such as scratches, on the alignment film 15. Such scratches on the alignment film 15 are not recovered even if the color filter substrate 5 is returned to its original position. Thus, alignment of the liquid crystal is deviated. As a result, there occurs a light leakage that refers to a leakage of an undesired light.

The leaking light is reddish, greenish, or bluish on a black pixel of the liquid crystal panel depending on a position of the spacer 30. Such a phenomenon is typically referred to as a "red eye defect". This defect is illustrated within the dashed circle shown in FIG. 2.

In order to prevent light leakage caused by a movement of the spacer 30, the black matrix 6 may be designed to be wider based on a position of the spacer 30. However, this is a big obstacle to satisfying the needs of customers who demand a high resolution and a high aperture ratio. Particularly, securing an aperture ratio of the liquid crystal display device is viewed as a considerable limitation.

Figure 3:
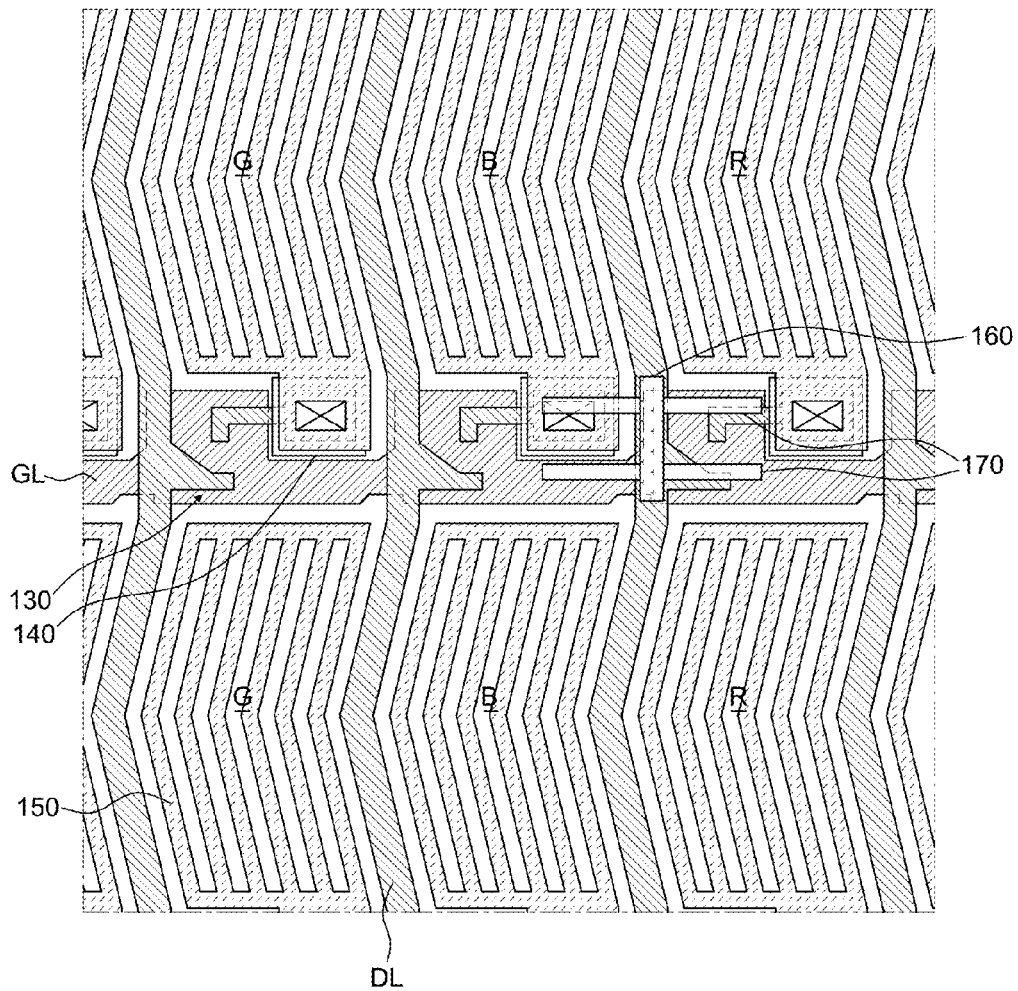
FIG. 3 is a schematic plan view of a liquid crystal display device according to a first exemplary embodiment of the present invention.
Figure 4:
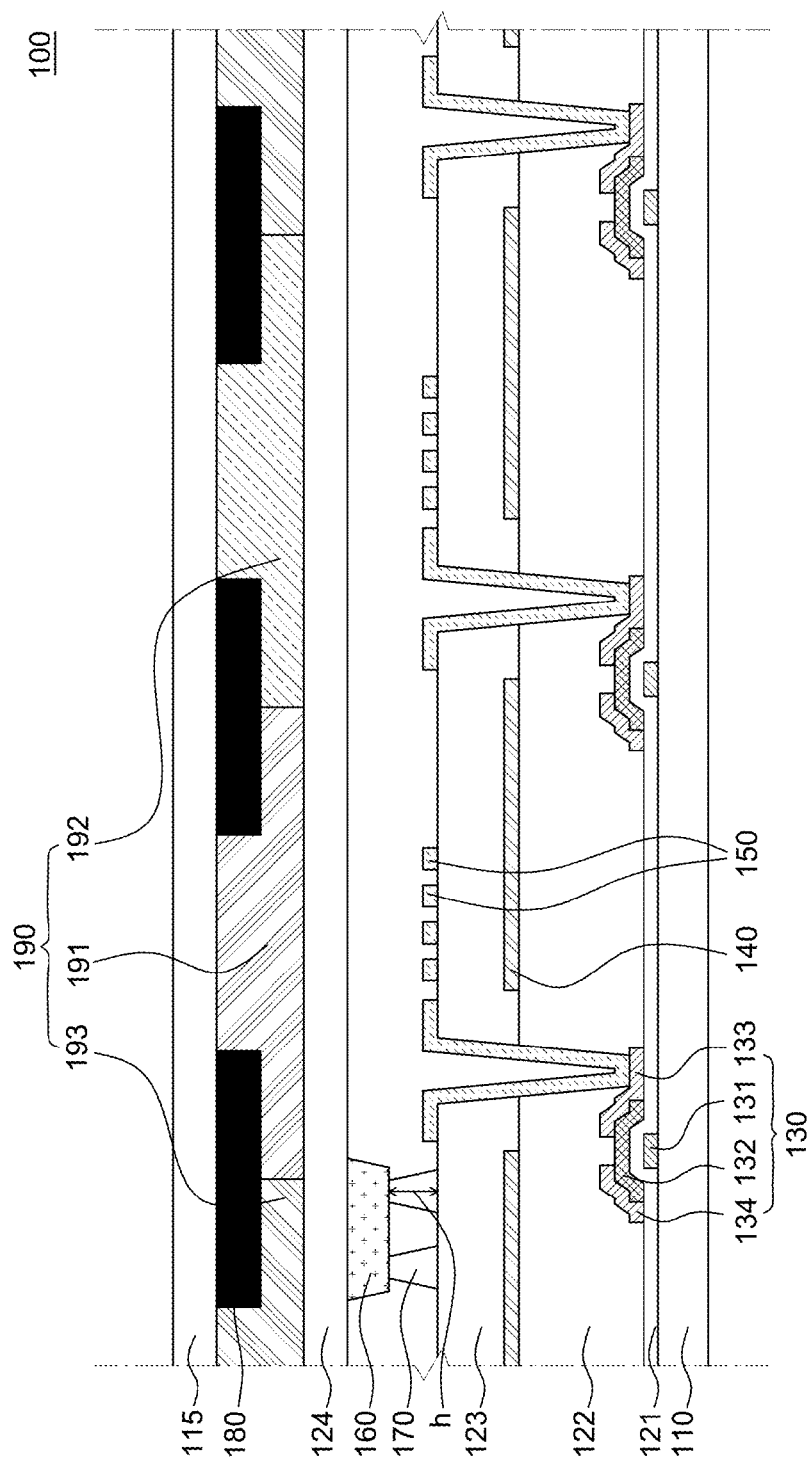
FIG. 4 is a schematic cross-sectional view of a liquid crystal display device according to the first exemplary embodiment of the present invention.

FIG. 3 is a schematic plan view of a liquid crystal display device according to a first exemplary embodiment of the present invention. FIG. 4 is a schematic cross-sectional view of a liquid crystal display device according to this exemplary embodiment of the present invention. Referring to FIG. 3 and FIG. 4, a liquid crystal display device 100 includes a first substrate 110, a second substrate 115, a thin film transistor 130, a planarization layer 122, a pixel electrode 150, a common electrode 140, a black matrix 180, a spacer 160, and a bump pattern 170. In FIG. 3, among elements of the liquid crystal display device 100, only gate lines GL, data lines DL, the thin film transistor 130, the common electrode 140, and the pixel electrode 150, the spacer 160, and the bump pattern 170 are illustrated for convenience in explanation.

The first substrate 110 is an array substrate of the liquid crystal display device 100 and includes multiple pixels. The multiple pixels are defined by the gate lines GL and the data lines DL crossing each other. In the liquid crystal display device 100, N gate lines GL and M data lines cross each other so as to form M×N pixels. However, in FIG. 3, only two red pixels R, two green pixels G, and two blue pixels B are illustrated for convenience of the explanation. Referring to FIG. 3, among the multiple pixels, the green pixel G, the blue pixel B, and the red pixel R are defined in sequence on a plane.

The thin film transistor 130 is formed on the first substrate 110. The thin film transistor 130 is formed on each of the pixels R, G, and B. Each thin film transistor 130 includes a gate electrode 131, an active layer 132, a source electrode 133, and a drain electrode 134 formed on the first substrate 110. To be specific, the gate electrode 131 electrically connected with the gate line GL is formed on the first substrate 110, a gate insulating layer 121 is formed on the gate electrode 131, the active layer 132 in which a channel is formed is on the gate insulating layer 121, and the drain electrode 134 electrically connected with the data line DL and the source electrode 133 electrically connected with the pixel electrode 150 are formed on the active layer 132. The active layer 132 may be formed of amorphous silicon, polycrystalline silicon, an oxide semiconductor, etc.

The planarization layer 122 is formed to cover the thin film transistor 130 on the first substrate 110. The planarization layer 122 is configured to planarize an upper part of the first substrate 110 on which the thin film transistor 130 is formed. The planarization layer 122 may be formed of an organic insulating material having a low dielectric constant such as photo acryl. Although not illustrated in FIG. 4, a separate passivation layer may be formed on the thin film transistor 130, and the planarization layer 122 may be formed on the passivation layer.

The common electrode 140 is formed on the planarization layer 122. The common electrode 140 is configured to drive the liquid crystal layer (not illustrated) and formed into a single pattern in an area except a contact hole area for electrically connecting the pixel electrode 150 with the source electrode 133 of the thin film transistor 130. Although not illustrated in FIG. 3 and FIG. 4, the common electrode 140 may be electrically connected through a separate contact hole with a common line in parallel with the gate line GL.

The protective layer 123 is formed on the common electrode 140. The protective layer 123 protects the common electrode 140 and also planarizes an upper part of the common electrode 140. The protective layer 123 may be formed of the same material as that of the planarization layer 122, or may be formed of an insulating material different from that of the planarization layer 122.

The pixel electrode 150 is formed on the protective layer 123. The pixel electrode 150 is configured to drive the liquid crystal layer and formed into a box shape on each pixel and also formed on the protective layer 123 so as to have multiple slits. The pixel electrode 150 is electrically connected with the source electrode 133 of the thin film transistor 130 through the contact holes formed in the planarization layer 122 and the protective layer 123. As illustrated in FIG. 3, the pixel electrode 150 may have a shape in which a central portion is bent at least one time. The pixel electrode 150 and the common electrode 140 may be formed of a transparent conductive material.

Although FIG. 3 illustrates that the pixel electrode 150 is formed into a box shape including multiple slits and the common electrode 140 is formed into a single pattern, the common electrode 140 may be formed so as to have multiple slits instead of the pixel electrode 150, and the pixel electrode 150 and the common electrode 140 may be formed on the same layer.

The second substrate 115 is a color filter substrate of the liquid crystal display device that faces the first substrate 110. The black matrix 180 configured to define the multiple pixels as shielding areas and aperture areas are formed on the second substrate 115. That is, an area where the black matrix 180 is formed is defined as a shielding area, and an area where the black matrix 180 is not formed is defined as an aperture area. In the area corresponding to the shielding area, various driving elements and lines such as the thin film transistor 130, the data lines DL, and the gate lines GL are formed, and in the area defined as the aperture area, the pixel electrode 150 and the common electrode 140 are formed.

Multiple color filters 190 are formed on the second substrate 115 on which the black matrix 180 is formed. To be specific, a red color filter 191, a green color filter 192, and a blue color filter 193 are formed so as to respectively correspond to aperture areas of the red pixel R, the green pixel G, and the blue pixel B. A part of each of the red color filter 191, the green color filter 192, and the blue color filter 193 may be overlapped with the black matrix 180.

An overcoating layer 124 is formed on the second substrate 115 so as to cover the black matrix 180, the red color filter 191, the green color filter 192, and the blue color filter 193. The overcoating layer 124 is configured to planarize a lower part of the second substrate 115 on which the black matrix 180, the red color filter 191, the green color filter 192, and the blue color filter 193 are formed, and the overcoating layer 124 is formed of an insulating material. The overcoating layer 124 may be formed of the same material as that of the planarization layer 122.

The spacer 160 formed into a bar shape is formed on the overcoating layer 124 between the first substrate 110 and the second substrate 115. The bar-shaped spacer 160 is a cell gap spacer configured to maintain a cell gap of the liquid crystal display device 100. The bar-shaped spacer 160 is formed in a shielding area where the black matrix 180 is formed. The bar-shaped spacer 160 is formed so as to be overlapped with the data line DL and extended in the same direction as the data line DL.

The bar-shaped spacer 160 is located so as to correspond to a shielding area between the blue pixel B and the red pixel R. To be specific, the bar-shaped spacer 160 is formed so as to be overlapped with the data line DL formed in the shielding area between the blue pixel B and the red pixel R and also overlapped with the black matrix 180.

The bump pattern 170 formed into a bar shape is formed on an upper surface of the protective layer 123 between the first substrate 110 and the second substrate 115 so as to correspond to the shape of the bar-shaped spacer 160. The bar-shaped bump pattern 170 is extended in the same direction as the gate line GL and positioned by covering the blue pixel B and the red pixel R.

The bar-shaped bump pattern 170 may be formed into two rows extended in the same direction as the gate line GL. That is, the bump pattern 170 formed into two bars may be formed to correspond to the shape of the spacer 160 formed into a single bar, and each bump pattern 170 formed into two bars is formed in the extension direction of the gate line GL.

The bar-shaped bump pattern 170 may be formed of an organic film or an inorganic film. A height h of the bar-shaped bump pattern 170 may be 4000 Å or more. That is, the height h of the bar-shaped bump pattern 170 may be 4000 Å or more in order to maintain a distance between the bar-shaped spacer 160 and the protective layer 123.

The bar-shaped bump pattern 170 and the bar-shaped spacer 160 are formed so as to be in contact with each other. Referring to FIG. 4, the bar-shaped bump pattern 170 and the bar-shaped spacer 160 may be formed so as to bring an upper surface of the bar-shaped bump pattern 170 into contact with a lower surface of the bar-shaped spacer 160.

FIG. 3 and FIG. 4 illustrate that the bar-shaped spacer 160 is positioned only between the red pixel R and the blue pixel B and the bar-shaped bump pattern 170 is positioned covering the red pixel R and the blue pixel B, but may not be limited thereto. The bar-shaped spacer 160 may be formed between the red pixel R and the green pixel G and between the green pixel G and the blue pixel B, and the bar-shaped bump pattern 170 may be positioned covering the red pixel and the green pixel G and covering the green pixel G and the blue pixel B.

Although not illustrated in FIG. 3 and FIG. 4, a first alignment film may be formed on the protective layer 123 of the first substrate 110 and a second alignment film may be formed on the overcoating layer 124 of the second substrate 115. The first alignment film and the second alignment film may be formed of polyimide (PI).

Although not illustrated in FIG. 3 and FIG. 4, a liquid crystal layer is interposed between the first substrate 110 and the second substrate 115. The liquid crystal layer may be interposed between the protective layer 123 of the first substrate 110 and the overcoating layer 124 of the second substrate 115, and more specifically, the liquid crystal layer may be interposed between the first alignment film and the second alignment film.

Although not illustrated in FIG. 3 and FIG. 4, a backlight unit configured to supply light to the liquid crystal layer of the liquid crystal display device 100 may be further included in the liquid crystal display device 100.

Although FIG. 3 and FIG. 4 illustrate the bar-shaped bump pattern 170 formed on the first substrate 110's side and the bar-shaped spacer 160 formed on the second substrate 115's side, the bar-shaped spacer 160 may be formed on the first substrate 110 and the bar-shaped bump pattern 170 may be formed on the second substrate 115.

Although FIG. 3 and FIG. 4 illustrate only the spacer 160 configured to maintain a cell gap, a push spacer configured to prevent contact of features on the first substrate 110 with features of the second substrate 115 when subject to an external force may be further adopted in the liquid crystal display device 100. If the push spacer is adopted, the push spacer may be formed in a cylinder shape or a bar shape. The push spacer may be formed above the bar-shaped bump pattern 170 so as to be separate from the bar-shaped bump pattern 170 formed on the first substrate 110.

In a conventional technology in which a spacer configured to maintain a cell gap between a first substrate and a second substrate is used and the spacer is in direct contact with an alignment film formed on the first substrate, if an external force is applied to the spacer, the spacer is moved, and, thus, the alignment film is damaged and a defect occurs. To be specific, if an external force is applied to a liquid crystal display device, the spacer formed on the second substrate may be moved on the alignment film formed on the first substrate and then returned to its original position. Herein, the moving spacer causes damage to the alignment film, and due to such damage, a liquid crystal of a liquid crystal layer may be misaligned and light leakage may occur.

In order to prevent the above-described light leakage, a method has been used in which a size of a black matrix at a position where a spacer is formed is designed to be greater in size than a black matrix at a position where a spacer is not formed. However, an increase in the size of the black matrix may cause a decrease in an aperture ratio of a liquid crystal display device and asymmetric arrangement of the black matrixes may cause a color difference.

In the liquid crystal display device 100 according to an exemplary embodiment of the present invention, the bar-shaped spacer 160 and the bar-shaped bump pattern 170 arranged in a direction perpendicular to the bar-shaped spacer 160 are used. Thus, even if the bar-shaped spacer 160 is moved by an external force, the bar-shaped spacer 160 is not brought into contact with the alignment film. Therefore, alignment film and red eye defects can be prevented. Further, it is not necessary to design the black matrix 180 to be increased in size in order to prevent a red eye defect. Thus, it is possible to prevent a red eye defect and also possible to improve an aperture ratio of the liquid crystal display device 100. Further, it is possible to provide a pixel structure suitable for the liquid crystal display device 100 with a high resolution.

Hereinafter, the bar-shaped spacer 160 and the bar-shaped bump pattern 170 of the liquid crystal display device 100 according to the present invention will be described in more detail with reference to FIG. 5a and FIG. 5b.

Figure 5A:
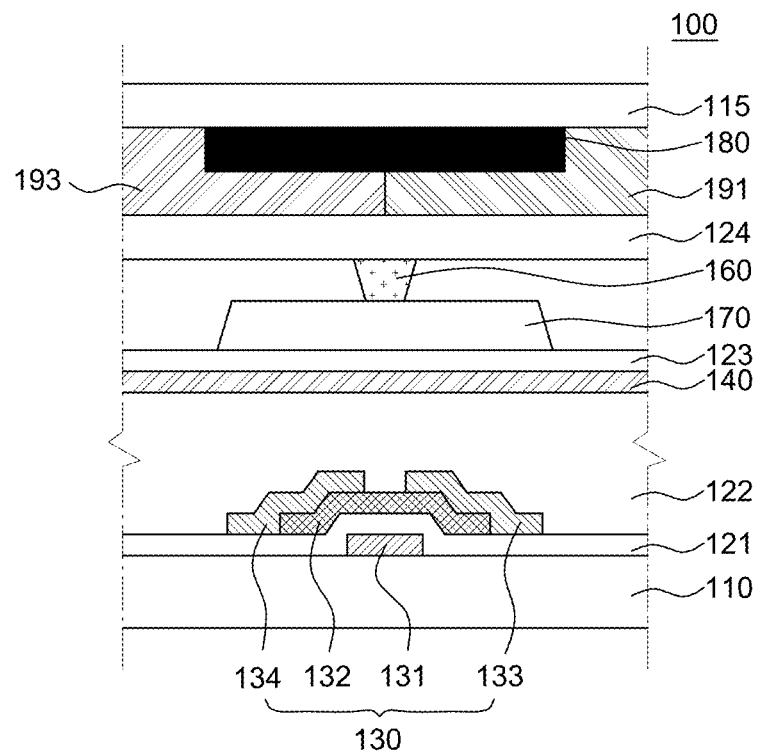
FIG. 5a and FIG. 5b are schematic cross-sectional views provided to explain a spacer and a bump pattern of a liquid crystal display device according to the first exemplary embodiment of the present invention.
Figure 5B:
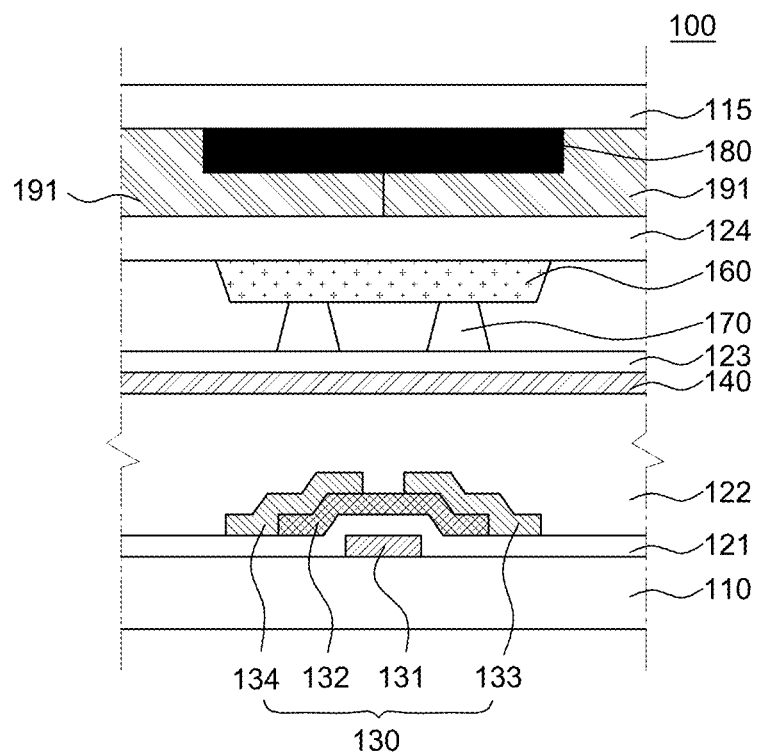

FIG. 5a and FIG. 5b are schematic cross-sectional views provided to explain a spacer and a bump pattern of a liquid crystal display device according to an exemplary embodiment of the present invention. FIG. 5a and FIG. 5b illustrate only the thin film transistor 130 formed on the first substrate 110's side, the planarization layer 122, the common electrode 140, the protective layer 123, the bar-shaped bump pattern 170. The red color filter 191 is formed on the second substrate 115's side for convenience in explanation, and also illustrate that the thin film transistor 130 is illustrated as an example of a driving element on the first substrate 110's side in order to express that various driving elements and various liens are formed under the black matrix 180. That is, FIG. 5a and FIG. 5b are not actual cross-sectional views but schematic cross-sectional views provided to describe an exemplary embodiment of the present invention.

FIG. 5a is a cross-sectional view taken by cutting the liquid crystal display device 100 in the same direction as the gate line GL. Therefore, it can be confirmed that the bar-shaped bump pattern 170 is extended in the same direction as the gate line GL from the blue pixel B in which the blue color filter 193 is formed to the red pixel R in which the red color filter 191 is formed. Further, it can be confirmed that the bar-shaped bump pattern 170 is brought into contact with the lower surface of the bar-shaped spacer 160 in order for the bar-shaped spacer 160 formed on the second substrate 115's side not to be brought into contact with the alignment film.

FIG. 5b is a cross-sectional view taken by cutting the liquid crystal display device 100 in the same direction as the data line DL. Therefore, it can be confirmed that the bar-shaped spacer 160 is extended in the same direction as the data line DL. Further, it can be confirmed that the bar-shaped bump pattern 170 arranged in two rows is brought into contact with the lower surface of the bar-shaped spacer 160 in order for the bar-shaped spacer 160 formed on the second substrate 115's side not to be brought into contact with the alignment film.

Figure 6A:
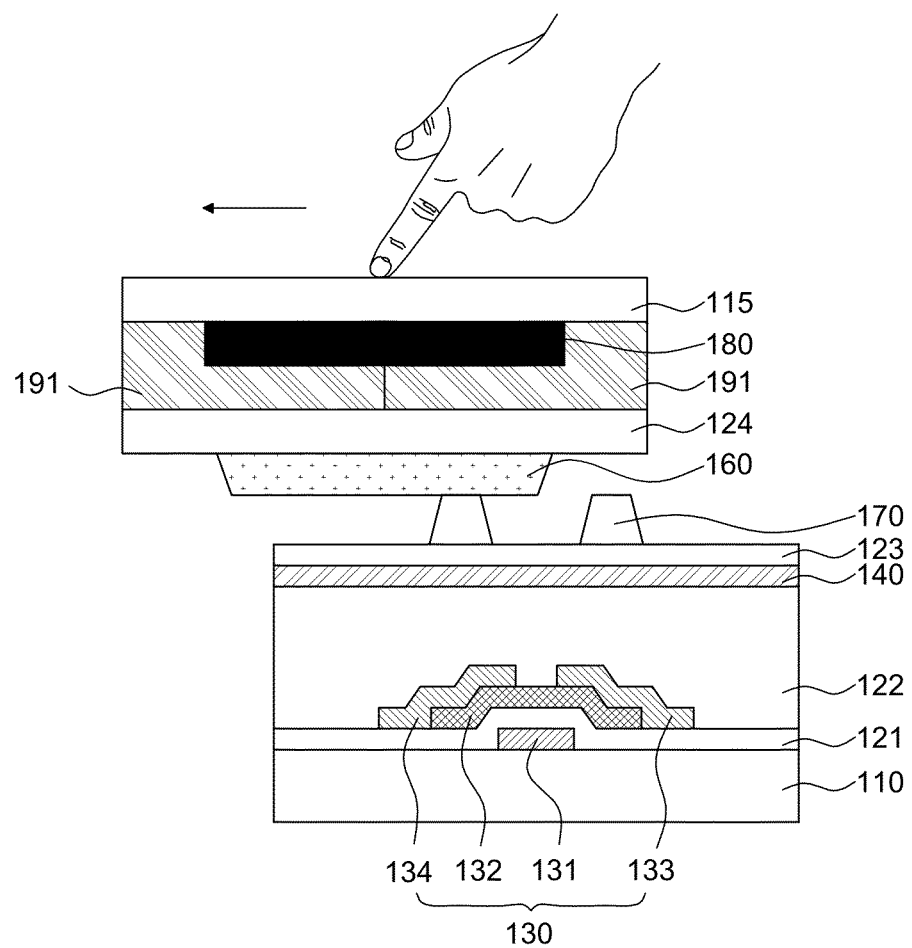
FIG. 6a and FIG. 6b are schematic cross-sectional views of a liquid crystal display device according to the first exemplary embodiment of the present invention in a state where a spacer is pushed by an external force.
Figure 6B:
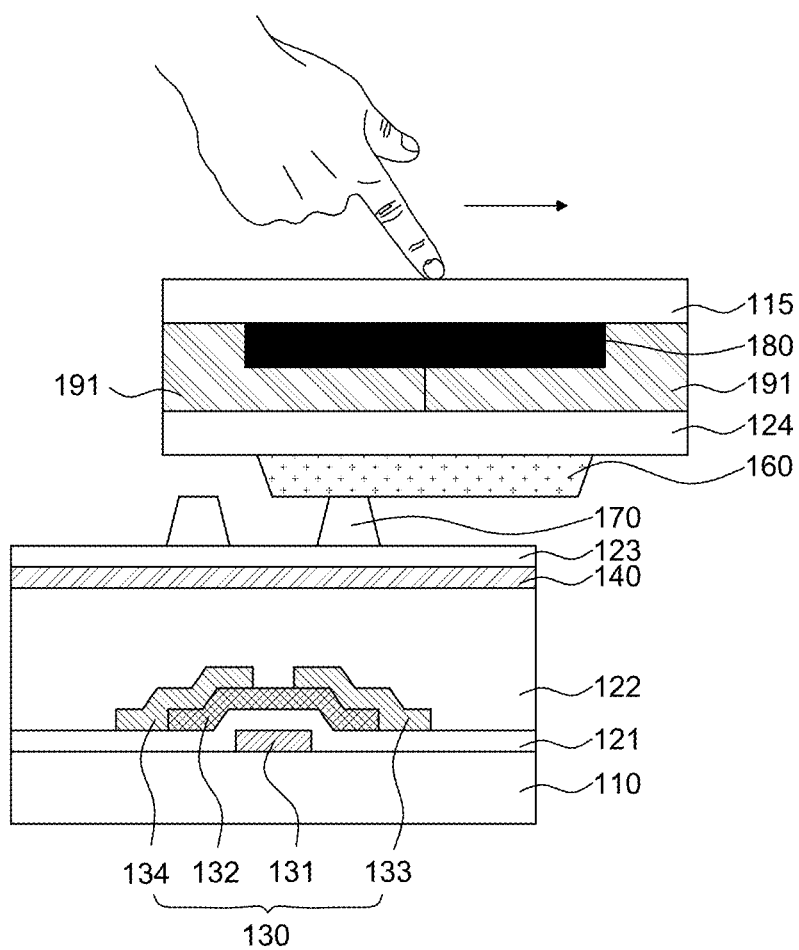

FIG. 6a and FIG. 6b are schematic cross-sectional views of a liquid crystal display device according to an exemplary embodiment of the present invention in a state where a spacer is pushed by an external force. FIG. 6a is a cross-sectional view showing a state where the second substrate 115 of the liquid crystal display device 100 illustrated in FIG. 5a is pushed to one side of the liquid crystal display device 100 by an external force, and FIG. 6b is a cross-sectional view showing a state where the second substrate 115 of the liquid crystal display device 100 illustrated in FIG. 5b is pushed to the other side of the liquid crystal display device 100 by an external force.

Referring to FIG. 6a and FIG. 6b, when the second substrate 115 is pushed by an external force, the bar-shaped spacer 160 formed on the second substrate 115's side is also pushed to one side or the other of the liquid crystal display device 100. When the external force is cleared, the bar-shaped spacer 160 formed on the second substrate 115's side is returned to its original position as shown in FIG. 5b. While the bar-shaped spacer 160 is moved, if the bar-shaped spacer 160 is brought into contact with the alignment film formed on the first substrate 110's side and causes damage to the alignment film, a light leakage, referred to as "red eye defect", may occur.

Accordingly, in the liquid crystal display device 100 according to an exemplary embodiment of the present invention, even if the bar-shaped spacer 160 is moved to one side or the other of the liquid crystal display device 100, the bar-shaped spacer 160 is moved on the bar-shaped bump pattern 170 arranged in two rows on the first substrate 110's side. That is, when the bar-shaped spacer 160 is moved, the bar-shaped spacer 160 is not brought into contact with the alignment film formed on the first substrate 110's side. Therefore, in the liquid crystal display device 100 according to an exemplary embodiment of the present invention, even if the bar-shaped spacer 160 is moved by an external force, the bar-shaped spacer 160 is not brought into contact with the alignment film by using the bar-shaped spacer 160 and the bar-shaped bump pattern 170 disposed in a direction perpendicular to the bar-shaped spacer 160. Thus, a red eye defect can be prevented. Further, it is not necessary to design the black matrix 180 to be increased in size in order to prevent a red eye defect. Thus, it is possible to prevent a red eye defect and also possible to improve an aperture ratio of the liquid crystal display device 100. Further, it is possible to provide a pixel structure suitable for the liquid crystal display device 100 with a high resolution.

Figure 7:
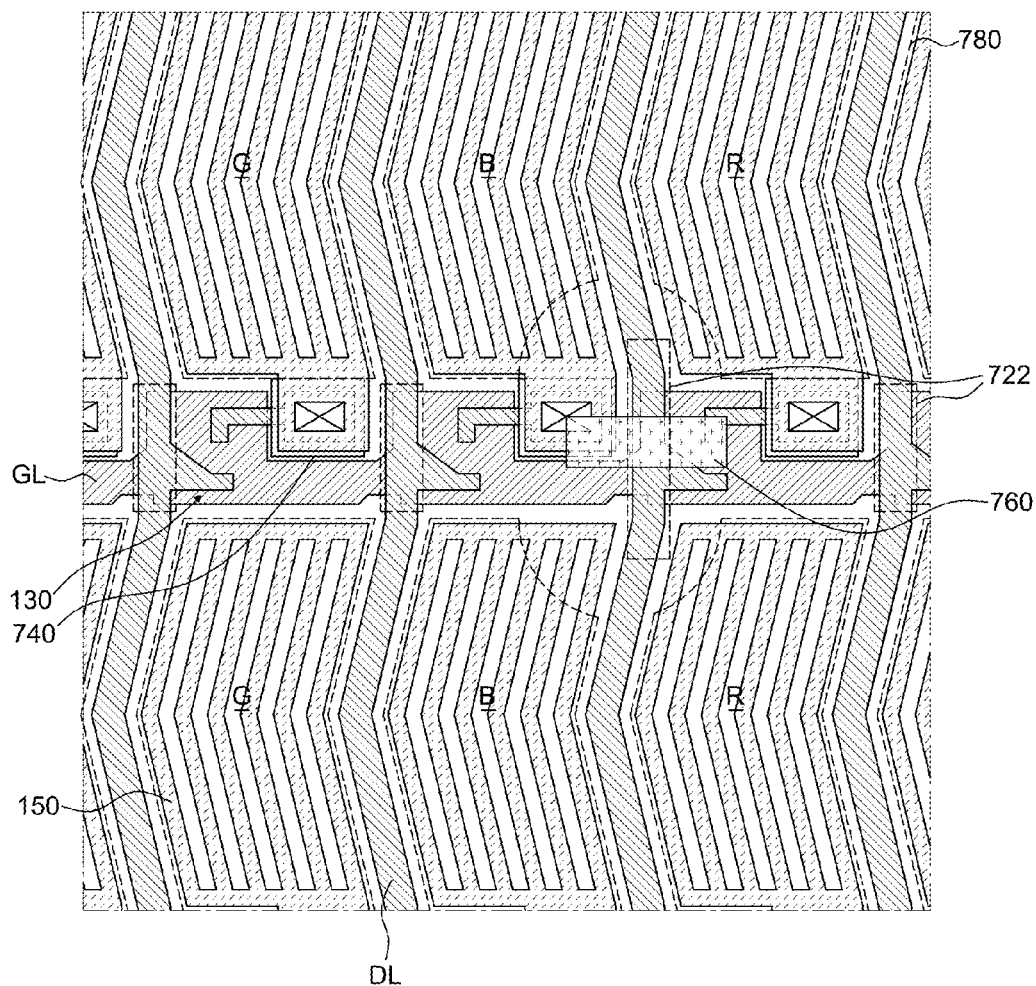
FIG. 7 is a schematic plan view of a liquid crystal display device according to a second exemplary embodiment of the present invention.
Figure 8:
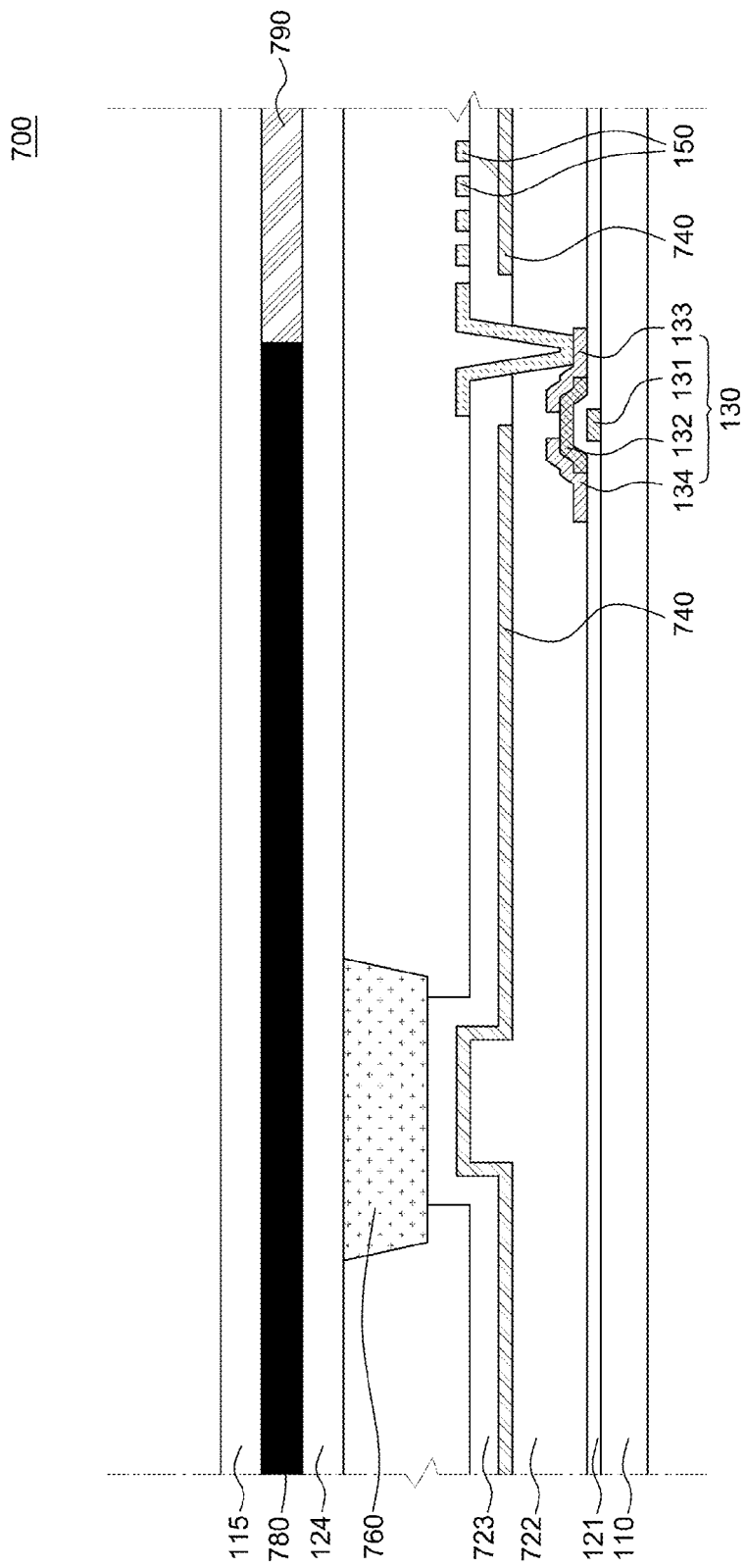
FIG. 8 is a schematic cross-sectional view of a liquid crystal display device according to the second exemplary embodiment of the present invention.

FIG. 7 is a schematic plan view of a liquid crystal display device according to a second exemplary embodiment of the present invention. FIG. 8 is a schematic cross-sectional view of a liquid crystal display device according to the second exemplary embodiment of the present invention. A liquid crystal display device 700 illustrated in FIG. 7 and FIG. 8 includes a planarization layer 722, a protective layer 723, a common electrode 740, a spacer 760, a black matrix 780, and a color filter 790 which are different in shape from those of the liquid crystal display device 100 illustrated in FIG. 1 and FIG. 2 and the bump pattern 170 is excluded. Therefore, redundant description of substantially the same components will be omitted.

The planarization layer 722 is formed to cover the thin film transistor 130 on the first substrate 110. The planarization layer 722 is configured to planarize the upper part of the first substrate 110 on which the thin film transistor 130 is formed, particularly, to planarize a portion corresponding to the color filters 190 formed on the red pixel R, the green pixel G, and the blue pixel B. The planarization layer 722 may be formed of an organic insulating material having a low dielectric constant such as photoacryl.

The planarization layer 722 has at least one step height at a position corresponding to the bar-shaped spacer 760. To be specific, referring to FIG. 8, the planarization layer 722 is formed to have at least one step height at a position corresponding to the black matrix 780 on which the bar-shaped spacer 760 is formed. A function of the planarization layer 722 will be described in detail later together with the bar-shaped spacer 760.

Although not illustrated in FIG. 8, a separate passivation layer may be formed on the thin film transistor 130 and the planarization layer 722 may be formed on the passivation layer.

The common electrode 740 is formed on the planarization layer 722. The common electrode is configured to drive the liquid crystal layer (not illustrated) and formed into a single pattern in an area except a contact hole area for electrically connecting the pixel electrode 150 with the source electrode 133 of the thin film transistor 130. The common electrode 740 is formed on at least one step portion of the planarization layer 722 along a shape of the step portion of the planarization layer 722.

The protective layer 723 is formed on the common electrode 740. The protective layer 723 formed on the common electrode 140 is particularly configured to planarize a portion corresponding to the color filter 790 formed on the red pixel R, the green pixel G, and the blue pixel B. The protective layer 723 is formed on at least one step portion of the planarization layer 722 along a shape of the step portion of the planarization layer 722.

The bar-shaped spacer 760 is formed on the black matrix 780 between the first substrate 110 and the second substrate 115. The bar-shaped spacer 760 is a cell gap spacer configured to maintain a cell gap of the liquid crystal display device 700. The bar-shaped spacer 760 is formed in a shielding area where the black matrix 780 is formed. The bar-shaped spacer 760 is formed so as to be overlapped with the gate line GL and extended in the same direction as the gate line GL.

The bar-shaped spacer 760 is located to correspond to a shielding area between the blue pixel B and the red pixel R. To be specific, the bar-shaped spacer 760 is formed so as to be overlapped with the gate line GL formed in a shielding area between the blue pixel B and the red pixel R and also overlapped with the black matrix 780.

Referring to FIG. 8, the bar-shaped spacer 760 is in contact with the protective layer 723 formed on the first substrate 110 in the shielding area. To be specific, the planarization layer 722 is formed to have at least one step height on the first substrate 110, the common electrode 740 is formed on the planarization layer 722 along a shape of the planarization layer 722, and the protective layer 723 is formed on the common electrode 740 along a shape of the common electrode 740. Therefore, the protective layer 723 is also formed to have at least one step height, and the bar-shaped spacer 760 is formed so as to be in contact with the protective layer 723 in the shielding area.

Referring to FIG. 7, the black matrix 780 includes a portion extended in the same direction as the gate line GL. Herein, the black matrix 780 extended in the same direction as the gate line GL includes a portion covering a space between the blue pixel B and the red pixel R and a portion covering a space between blue pixel B and the green pixel G. As described above, the planarization layer 722 has at least one step height at a position corresponding to the bar-shaped spacer 760 and the bar-shaped spacer 760 is located to correspond to the shielding area between the blue pixel B and the red pixel R, and, thus, at least one step height of the planarization layer 722 is also formed between the blue pixel B and the red pixel R.

Referring to FIG. 7 and FIG. 8, at least one step portion of the planarization layer 722 is perpendicularly in contact with the bar-shaped spacer 760. That is, a protruded portion of the planarization layer 722 has at least one step portion of the planarization layer 722 formed so as to be extended in the same direction as the data line DL. The bar-shaped spacer 760 is formed so as to be extended in the same direction as the gate line GL, and, thus, at least one step portion of the planarization layer 722 is perpendicularly in contact with the bar-shaped spacer 760.

FIG. 7 and FIG. 8 illustrate that the bar-shaped spacer 760 is positioned only between the red pixel R and the blue pixel B, but may not be limited thereto. The bar-shaped spacer 760 may also be formed between the red pixel R and the green pixel G and between the green pixel G and the blue pixel B.

In a conventional technology in which a spacer configured to maintain a cell gap between a first substrate and a second substrate is used and the spacer is in direct contact with an alignment film formed on the first substrate's side, if an external force is applied to the spacer, the spacer is moved, and, thus, the alignment film is damaged and a defect occurs. To be specific, if an external force is applied to a liquid crystal display device, the spacer formed on the second substrate is slidingly moved on the alignment film formed on the first substrate and then returned to its original position. Herein, the moving spacer causes damage to the alignment film, and due to the damage to the alignment film, a liquid crystal of a liquid crystal layer may be misaligned and a light leakage may occur.

In order to prevent the above-described light leakage, there has been used a method in which a size of a black matrix at a position where a spacer is formed is designed to be greater in size than a black matrix at a position where a spacer is not formed. However, an increase in the size of the black matrix may cause a decrease in an aperture ratio of a liquid crystal display device and asymmetric arrangement of the black matrixes may cause a color difference.

In the following, an effect of the liquid crystal display device 700 according to the present invention to solve the above-described problem of the conventional technology will be described in more detail with reference to FIG. 9a and FIG. 9b.

Figure 9A:
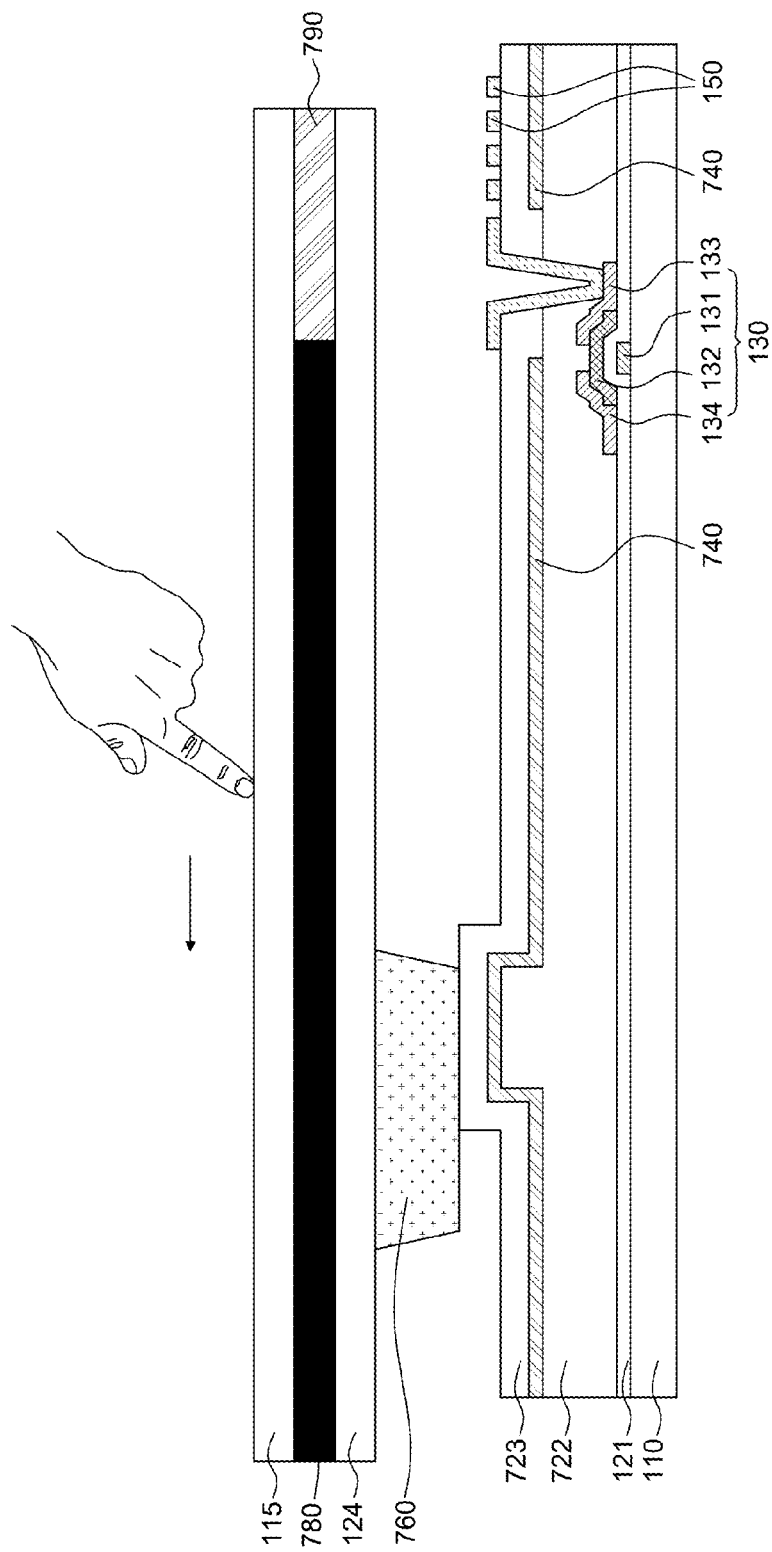
FIG. 9a and FIG. 9b are schematic cross-sectional views of a liquid crystal display device according to the second exemplary embodiment of the present invention in a state where a spacer is pushed by an external force.
Figure 9B:
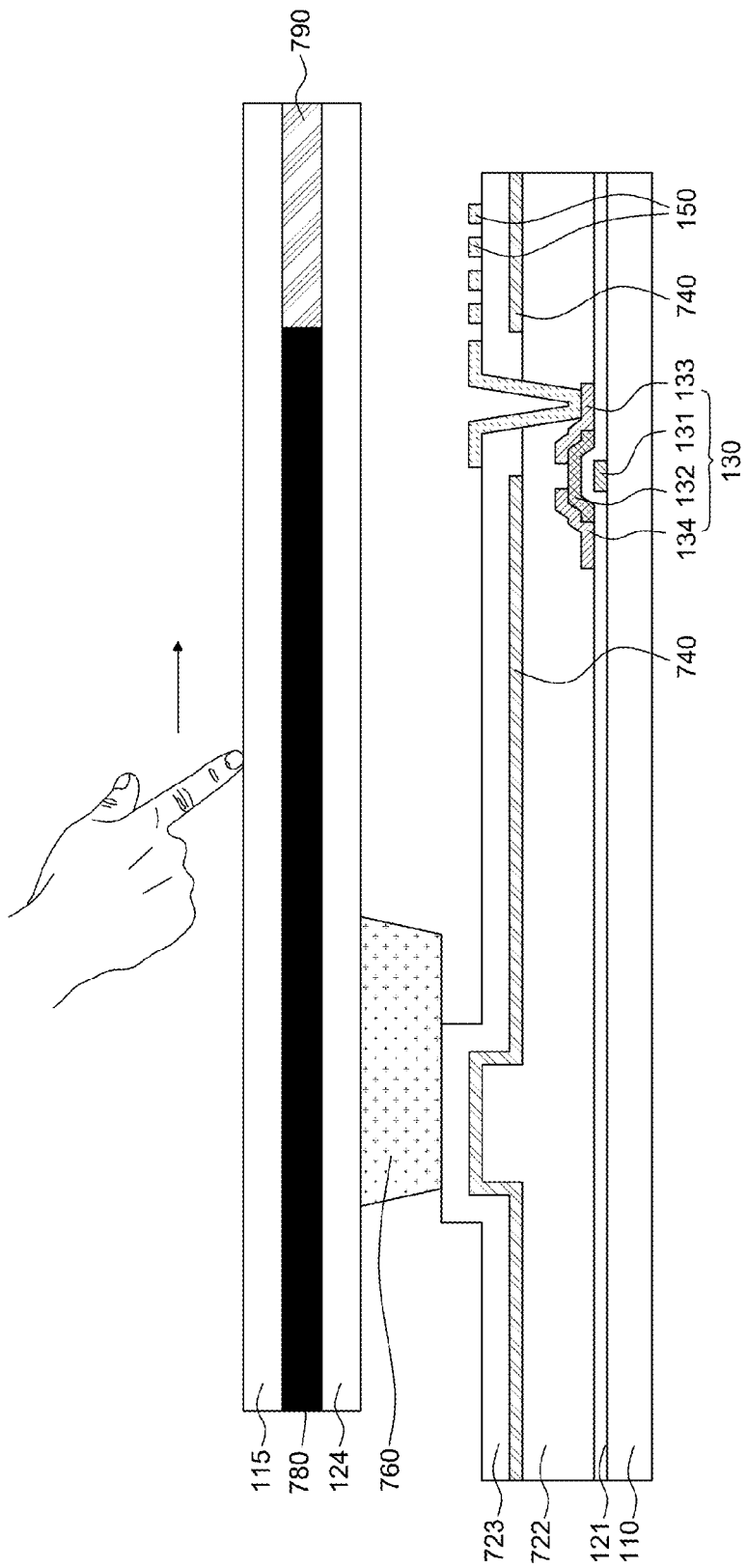

FIG. 9a and FIG. 9b are schematic cross-sectional views of a liquid crystal display device according to the second exemplary embodiment of the present invention in a state where a second substrate and spacer is pushed by an external force. FIG. 9a is a cross-sectional view showing a state where the second substrate 115 of the liquid crystal display device 700 illustrated in FIG. 8 is pushed to one side of the liquid crystal display device 700 by an external force, and FIG. 9b is a cross-sectional view showing a state where the second substrate 115 of the liquid crystal display device 700 illustrated in FIG. 8 is pushed to the other side of the liquid crystal display device 700 by an external force.

Referring to FIG. 9a and FIG. 9b, when the second substrate 115 is pushed by an external force, the bar-shaped spacer 760 formed on the second substrate 115 is also pushed to one side or the other of the liquid crystal display device 700, and when the external force is cleared, the bar-shaped spacer 760 formed on the second substrate 115 is returned to its original position as shown in FIG. 8. While the bar-shaped spacer 760 is moved, if the bar-shaped spacer 760 is brought into contact with the alignment film formed on the first substrate 110 and causes damage to the alignment film, a light leakage referred to as a "red eye defect" may occur.

Accordingly, in the liquid crystal display device 700 according to the second exemplary embodiment of the present invention, even if the bar-shaped spacer 760 is moved to one side or the other of the liquid crystal display device 700, the bar-shaped spacer 760 is moved on the protective layer 723 formed on the protruded planarization layer 722. That is, when the bar-shaped spacer 760 is moved, the bar-shaped spacer 760 is not brought into contact with the alignment film formed on the red pixel R, the green pixel G, and the blue pixel B. Therefore, in the liquid crystal display device 700 according to the second exemplary embodiment of the present invention, even if the bar-shaped spacer 760 is moved by an external force, the bar-shaped spacer 760 is not brought into contact with the alignment film formed on the red pixel R, the green pixel G, and the blue pixel B by using the bar-shaped spacer 760 and at least one step height of the planarization layer 722 oriented in a direction perpendicular to the bar-shaped spacer 760. Thus, a red eye defect can be prevented. Further, it is not necessary to design the black matrix 780 to be increased in size in order to prevent a red eye defect. Thus, it is possible to prevent a red eye defect and also possible to improve an aperture ratio of the liquid crystal display device 700. Further, it is possible to provide a pixel structure suitable for the liquid crystal display device 700 with a high resolution.

Figure 10:
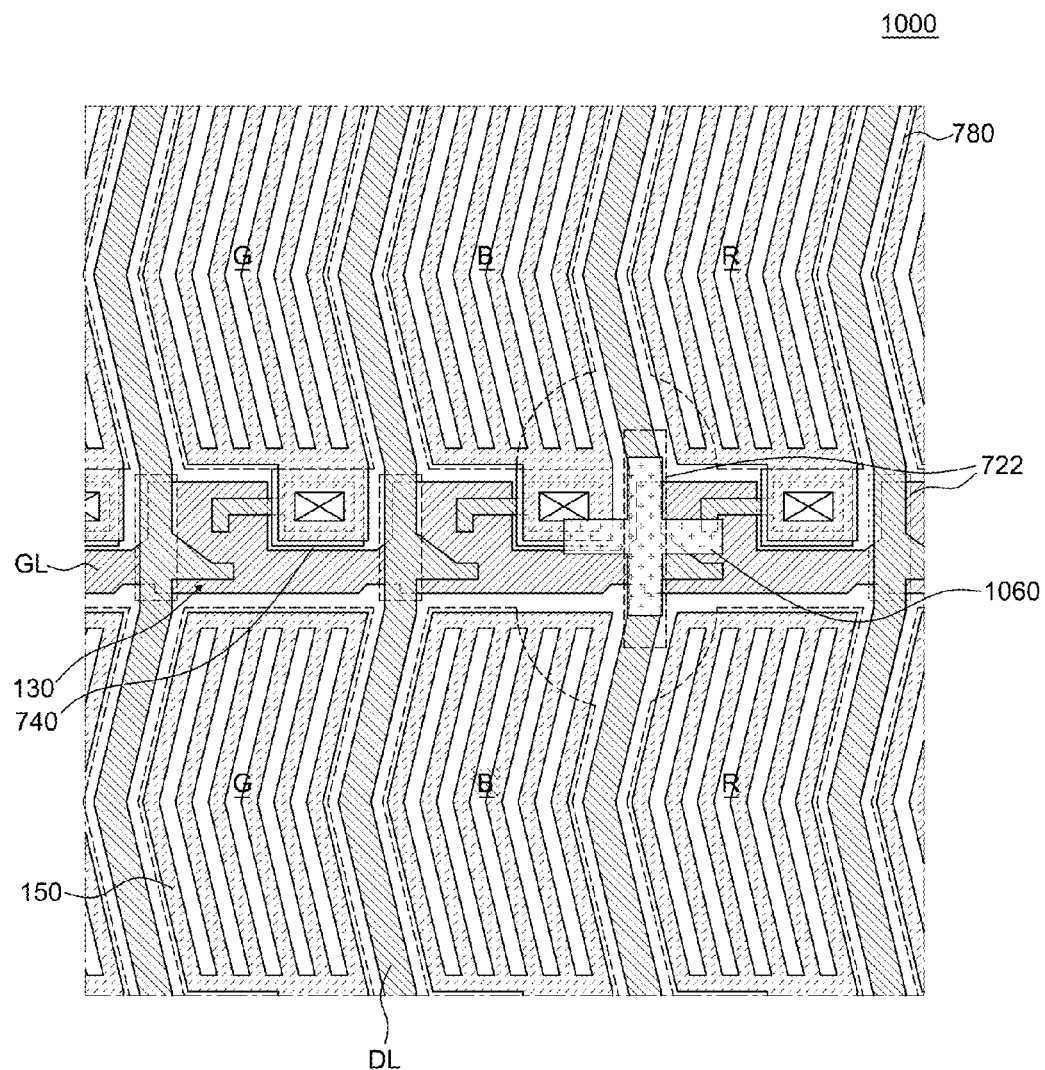
FIG. 10 is a schematic plan view of a liquid crystal display device according to a third exemplary embodiment of the present invention.

FIG. 10 is a schematic plan view of a liquid crystal display device according to a third exemplary embodiment of the present invention. A liquid crystal display device 1000 illustrated in FIG. 10 includes a spacer 1060 which has a different shape from that of the liquid crystal display device 700 illustrated in FIG. 7 and FIG. 8. Therefore, redundant description of substantially the same components will be omitted.

Referring to FIG. 10, the spacer 1060 has a cross shape. Herein, a cross shape of the spacer 1060 means that the spacer 1060 is formed of two bar-shaped portions intersecting each other. One of the two bar-shaped portions constituting the spacer 1060 may be extended in the same direction as the data line DL, and the other one may be extended in the same direction as the gate line GL.

In the liquid crystal display device 1000 according to the third exemplary embodiment of the present invention, the spacer 1060 is formed into a cross shape. Thus, it is possible to cope with any push of the second substrate 115 by an external force in up and down and left and right directions of the liquid crystal display device 1000.

Figure 11:
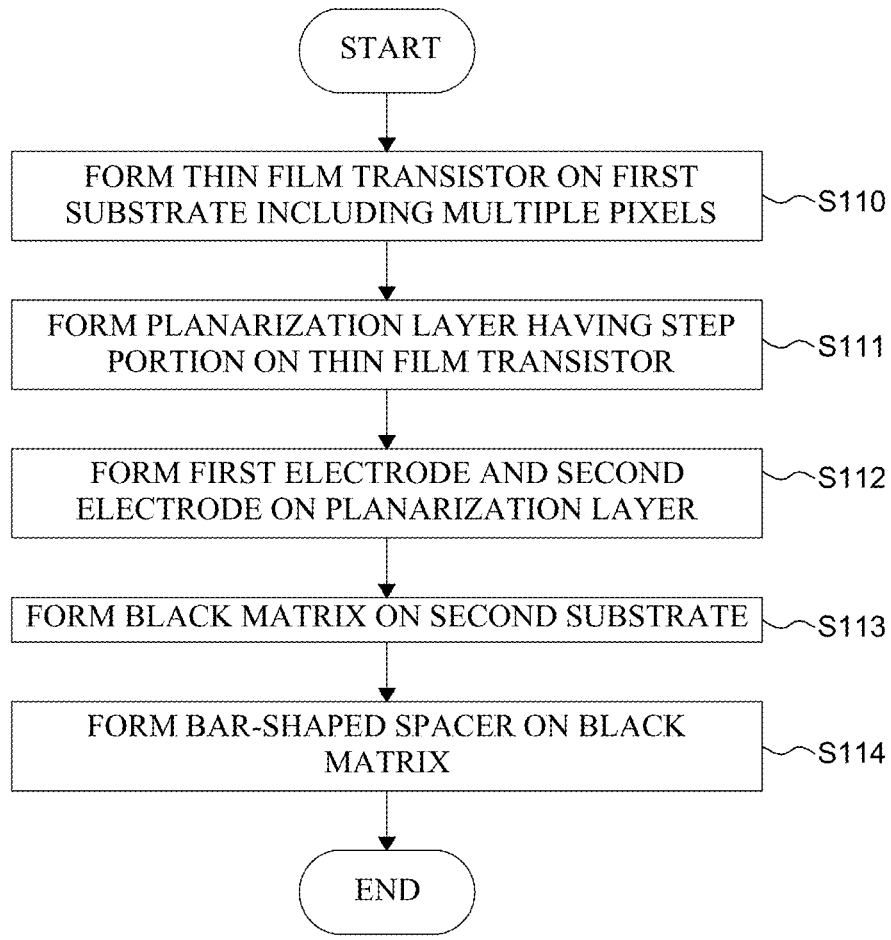
FIG. 11 is a flowchart provided to explain a method for manufacturing a liquid crystal display device according to a fourth exemplary embodiment of the present invention.

FIG. 11 is a flowchart provided to explain a method for manufacturing a liquid crystal display device according to a fourth exemplary embodiment of the present invention.

Firstly, a thin film transistor is formed on a first substrate including multiple pixel areas (S110). To be specific, a thin film transistor including a gate electrode, an active layer, a source electrode, and a drain electrode is formed on a first substrate.

Then, a planarization layer including a step portion is formed on the thin film transistor (S111). In order to form the planarization layer including a step portion, a half-tone mask process may be used. That is, by using the half-tone mask process, a relatively thick portion of the planarization layer and a relatively thin portion of the planarization layer can be formed at the same time.

Then, a first electrode and a second electrode configured to drive a liquid crystal layer are formed on the planarization layer (S112). To be specific, the first electrode may be formed on the planarization layer and the second electrode may be formed on a protective layer formed on the planarization layer. The first electrode may be one of a common electrode and a pixel electrode, and the second electrode may be other one of the common electrode and the pixel electrode.

Then, a black matrix configured to define multiple pixels as shielding areas and aperture areas is formed on a second substrate facing the first substrate (S113), and a bar-shaped spacer is formed on the black matrix so as to correspond to the step portion of the planarization layer (S114).

Although the exemplary embodiments of the present invention have been described in detail with reference to the accompanying drawings, the present invention is not limited thereto and may be embodied in many different forms without departing from the technical concept of the present invention. Therefore, the exemplary embodiments of the present invention are provided for illustrative purposes only but not intended to limit the technical concept of the present invention. The scope of the technical concept of the present invention is not limited thereto. Therefore, it should be understood that the above-described exemplary embodiments are illustrative in all aspects and do not limit the present invention. The protective scope of the present invention should be construed based on the following claims, and all the technical concepts in the equivalent scope thereof should be construed as falling within the scope of the present invention.

What is claimed is:

1. An apparatus comprising:
    a color filter (CF) substrate having a black matrix layer;
    a thin-film transistor (TFT) substrate having a liquid crystal alignment layer;
    a plurality of column spacers, between said CF substrate and said TFT substrate, corresponding to predetermined portions of said black matrix layer; and
    a plurality of protruded structures, between said CF substrate and said TFT substrate, each corresponding to one of said column spacers and configured to protect said liquid crystal alignment layer from damage due to external pressure, and
    wherein each of said plurality of protruded structures comprises a bump pattern facing a lower surface of one of said column spacers, said bump pattern being arranged in two or more rows extended in a same direction as a direction of a gate line.

2. The apparatus of claim 1, wherein each of said plurality of protruded structures comprises:
    an upper surface in proximity to said lower surface of one of said column spacers, said upper surface providing frictional resistance to restrict movement of said column spacers upon external pressure being applied thereto.

3. The apparatus of claim 2, wherein each of the plurality of protruded structures comprises:
    a step portion capable of contacting with said lower surface of one of said column spacers.

4. The apparatus of claim 2, wherein the protruded structure is formed of photo acryl material.

5. The apparatus of claim 1, wherein said bump pattern includes an organic film or an inorganic film.

6. The apparatus of claim 5, wherein said bump pattern has a thickness to maintain a distance between said column spacer and said TFT substrate.

7. The apparatus of claim 6, wherein said thickness is greater than or equal to 4000 Å.

8. The apparatus of claim 1, wherein each column spacer has a cross shape with two bar-shaped portions that intersect each other, a first of said two bar-shaped portions extended in a same direction as a data line and a second of said two bar-shaped portions extended in a same direction as a gate line.

9. The apparatus of claim 1, wherein said each column spacer is located between a blue sub-pixel and a red sub-pixel.

10. The apparatus of claim 1, wherein a number of the plurality of column spacers are in contact with one of the plurality of protruded structures, respectively.

11. A liquid crystal display panel comprising:
    a color filter substrate including a color filter and a black matrix;
    a thin-film transistor array substrate including a thin-film transistor and a liquid crystal alignment layer;
    a liquid crystal layer between the color filter substrate and the array substrate;
    a column spacer on the color filter substrate under the black matrix;
    a bar-shaped bump pattern on the array substrate in contact with the column spacer to prevent damage to the alignment layer when the color filter substrate and the array substrate are moved relative to each other, and wherein the column spacer is bar-shaped and extends in a same direction as a data line connected to the thin-film transistor, and the bar-shaped bump pattern extends in a same direction as a gate line connected to the thin-film transistor.

12. The liquid crystal display panel of claim 11, wherein the bar-shaped bump pattern is formed into two rows and crosses a direction of the column spacer.

13. The liquid crystal display panel of claim 11, wherein a width of the black matrix is the same between adjacent red, green, and blue sub-pixels.

* * * * *